United States Patent
Cao et al.

(10) Patent No.: US 10,706,324 B2
(45) Date of Patent: Jul. 7, 2020

(54) MULTI-VIEW EMBEDDING WITH SOFT-MAX BASED COMPATIBILITY FUNCTION FOR ZERO-SHOT LEARNING

(71) Applicant: HRL Laboratories, LLC, Malibu, CA (US)

(72) Inventors: Xi Hang Cao, Philadelphia, PA (US); Kyungnam Kim, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 185 days.

(21) Appl. No.: 15/874,856

(22) Filed: Jan. 18, 2018

(65) Prior Publication Data

US 2018/0225548 A1   Aug. 9, 2018

Related U.S. Application Data

(60) Provisional application No. 62/448,382, filed on Jan. 19, 2017.

(51) Int. Cl.
*G06K 9/62* (2006.01)
*G06K 9/72* (2006.01)
*G05D 1/02* (2020.01)
*G05D 1/00* (2006.01)

(52) U.S. Cl.
CPC ......... *G06K 9/6232* (2013.01); *G05D 1/0246* (2013.01); *G06K 9/6256* (2013.01); *G06K 9/6269* (2013.01); *G06K 9/6277* (2013.01); *G06K 9/726* (2013.01); *G05D 1/0088* (2013.01)

(58) Field of Classification Search
CPC .. G06K 9/6232; G06K 9/6256; G06K 9/6269; G06K 9/6277; G06K 9/726
See application file for complete search history.

(56) References Cited

U.S. PATENT DOCUMENTS

| | | | |
|---|---|---|---|
| 2003/0202683 A1* | 10/2003 | Ma | G08G 1/096716 382/104 |
| 2008/0175446 A1 | 7/2008 | Kirby et al. | |
| 2010/0189354 A1 | 7/2010 | De Campos et al. | |
| 2014/0267301 A1* | 9/2014 | Yang | G09G 5/24 345/467 |

(Continued)

OTHER PUBLICATIONS

Fu, Yanwei "Transductive Multi-View Zero-Shot Learning" IEEE Transactions on Pattern Analysis and Machine Intelligence. vol. 37 No. 11. (Year: 2015).*

(Continued)

*Primary Examiner* — Mekonen T Bekele
*Assistant Examiner* — Molly Delaney
(74) *Attorney, Agent, or Firm* — Tope-McKay & Associates (57) ABSTRACT

Described is a system for multi-view embedding for object recognition. During operation, the system receives an input image and transforms raw data of objects in the image with corresponding labels into low-level features and high-level semantic representations of the labels. A trained object recognition model is generated by embedding the low-level features with multiple high-level semantic representations. The system then receives data of an unknown object and assigns a label to the unknown object using the trained object recognition model. Finally, a device can be controlled based on the label.

23 Claims, 7 Drawing Sheets

(56) References Cited

U.S. PATENT DOCUMENTS

| | | | |
|---|---|---|---|
| 2016/0239711 A1 | 8/2016 | Gong | |
| 2016/0307072 A1 | 10/2016 | Zhou | |
| 2017/0124400 A1* | 5/2017 | Yehezkel Rohekar | ..................... G06K 9/00335 |
| 2018/0225548 A1* | 8/2018 | Cao | ..................... G06K 9/6232 |
| 2019/0050648 A1* | 2/2019 | Stojanovic | ......... G06K 9/00791 |
| 2019/0065492 A1* | 2/2019 | Cheng | ................... G06F 16/435 |
| 2019/0066493 A1* | 2/2019 | Sohn | .................... G08G 1/0175 |

OTHER PUBLICATIONS

J. Deng, N. Ding, Y. Jia, A. Frome, K. Murphy, S. Bengio, Y. Li, H. Neven, and H. Adam. Large-scale object classification using label relation graphs. In ECCV 2014, pp. 48-64. Springer, 2014.

Christoph H. Lampert, Hannes Nickisch, and Stefan Harmeling. "Attribute-based classification for zero-shot visual object categorization." IEEE Transactions on Pattern Analysis and Machine Intelligence 36.3 (2014): pp. 453-465.

Akata, Zeynep, et al. "Evaluation of output embeddings for fine-grained image classification." Proceedings of the IEEE Conference on Computer Vision and Pattern Recognition. 2015, pp. 2927-2936.

Fu, Zhenyong, et al. "Zero-shot object recognition by semantic manifold distance." Proceedings of the IEEE Conference on Computer Vision and Pattern Recognition. 2015, pp. 2635-2644.

Bernardino Romera-Paredes and P. H. S. Torr. "An embarrassingly simple approach to zero-shot learning." Proceedings of the 32nd International Conference on Machine Learning. 2015, pp. 1-10 and appendix pp. 1-3.

Ziming Zhang and Venkatesh Saligrama. "Zero-shot learning via semantic similarity embedding." Proceedings of the IEEE International Conference on Computer Vision. 2015, pp. 4166-4174.

Soravit Changpinyo, Wei-Lun Chao, Boqing Gong, and Fei Sha. Synthesized Classifiers for Zero-Shot Learning. In Proceedings of the IEEE Conference on Computer Vision and Pattern Recognition (CVPR), 2016, pp. 5327-5336.

Chuang Gan, Tianbao Yang, and Boqing Gong. "Learning Attributes Equals Multi-Source Domain Generalization." In Proceedings of the IEEE Conference on Computer Vision and Pattern Recognition (CVPR), 2016, pp. 87-97.

K. Simonyan, A. Zisserman, "Very Deep Convolutional Networks for Large-Scale Image Recognition," arXiv technical report, 2014, pp. 1-14.

Mikolov, Tomas; et al. "Efficient Estimation of Word Representations in Vector Space". arXiv:1301.3781☐(2013), pp. 1-12.

Notification of Transmittal of International Search Report and the Written Opinion of the International Searching Authority for PCT/US2018/014302; dated May 8, 2018.

International Search Report of the International Searching Authority for PCT/US2018/014302; dated May 8, 2018.

Written Opinion of the International Searching Authority for PCT/US2018/014302; dated May 8, 2018.

Notification of International Preliminary Report on Patentability (Chapter I) for PCT/US2018/014302; dated Aug. 1, 2019.

International Preliminary Report on Patentability (Chapter I) for PCT/US2018/014302; dated Aug. 1, 2019.

* cited by examiner

| Notation | Definition |
|---|---|
| $n$ | Number of training examples |
| $C$ | Number of seen classes (in training) |
| $V$ | Number of views |
| $v$ | The view number |
| $m_0$ | Dimension of the low-level feature space |
| $m_v$ | Dimension of the $v$th-view semantic space |
| $m$ | Dimension of the embedded space |
| $\{c_i\}_{i=1}^{C}$ | Class labels in training |
| $\{x_i\}_{i=1}^{n}$ | Low-level feature vectors of training examples, i.e. $x_i \in \mathbb{R}^{m_0}$ |
| $\{a_i\}_{i=1}^{n}$ | Labels of training examples, i.e. $a_i \in \{c_1, c_2, \ldots, c_C\}$ |
| $y_k^{(j)}$ | Intermediate representation of the $j$th label in the $v$th view; i.e. $y_k^{(j)} \in \mathbb{R}^{m_v}$, $v \in \{1, 2, \ldots, V\}$, and $j \in \{1, 2, \ldots, C\}$ |
| $y^{(j)}$ | Concatenation of $\{y_k^{(j)}\}_{k=1}^{V}$ |
| $\{W_{v,c}\}_{k=1}^{V}$ | Bilinear matrices |
| $\omega$ | Concatenation of $\{vec(W_{v,c})\}_{k=1}^{V}$ |
| $p_i$ | The probabilistic compatibility vector function of the $i$th example |
| $p_i^{(j)}$ | The $j$th component of $p_i$ |
| $t_i$ | The label vector of the $i$th example |

| Author | AwA | SUN | CUB-200-2011 | aPY |
|---|---|---|---|---|
| Lampert et. al | 57.50 | 72.00 | - | 38.16 |
| Akata et. al | 61.90 | - | 40.30 | - |
| Romeral-Paredes et. Al | 75.30 | 82.10 | - | 24.22 |
| Zhang et. al | 76.30 | 82.50 | 30.41 | 46.23 |
| Changpinyo et. al | 72.90 | 62.80 | 54.50 | - |
| Gan et. al | 73.80 | - | 43.70 | - |
| Present Method | 84.50 | 85.50 | 48.10 | 42.40 |

FIG. 7

MULTI-VIEW EMBEDDING WITH SOFT-MAX BASED COMPATIBILITY FUNCTION FOR ZERO-SHOT LEARNING

CROSS-REFERENCE TO RELATED APPLICATIONS

This application claims the benefit of and is a non-provisional patent application of U.S. 62/448,382, filed on Jan. 19, 2017, the entirety of which is hereby incorporated by reference.

BACKGROUND OF INVENTION

(1) Field of Invention

The present invention relates to a pattern recognition system and, more specifically, to pattern recognition system that implements zero-shot learning to recognize input novel patterns found in known data.

(2) Description of Related Art

Pattern recognition systems typically operate by receiving an input (in the form of an image, video, time-series of signal, etc.) and attempting to identify a known pattern in the input. The systems typically operate with some form of an optimization function that attempts to maximize a function in order to find the relevant solution.

An example of such an optimization method is referred to as Embarrassingly Simple Zero-shot Learning (ESZSL) (see the List of Incorporated Literature References, Literature Reference No. 1). The ESZSL approach proposed a bilinear model to bridge the low-level features and one high-level semantic representation of the target class label to formulate a best-fit based optimization problem. One of the disadvantages of ESZSL is that it did not propose explicitly how to use information from multiple views of the semantic representation of the labels. Another disadvantage of ESZSL is that the formulation of the best-fit optimization problem is naïve. The target label vectors in ESZSL are vectors with +1's and −1's, and the bilinear model output need to fit +1's and −1's, while the output of the bilinear model can be in the range of (−∞, +∞).

Existing zero-shot learning models focus on finding solutions to maximize the compatibility function values of feature vectors and their corresponding class high-level representations. Existing models also treat the compatibility function values of the same feature vector and different class' high-level representations independently. Moreover, for existing zero-shot learning algorithms that use best-fit based optimization formulations, the target values are usually constants; however, this may not be true.

Thus, a continuing need exists for an improved pattern recognition system.

SUMMARY OF INVENTION

This disclosure provides a system for multi-view embedding. In various embodiments, the system includes one or more processors and a memory. The memory is a non-transitory computer-readable medium having executable instructions encoded thereon, such that upon execution of the instructions, the one or more processors perform several operations. For example, the system receives an input image having objects. Raw data of objects in the image are transformed with corresponding labels into low-level features and high-level semantic representations of the labels. A trained object recognition model is generated by embedding the low-level features with multiple high-level semantic representations. Data of an unknown object is then received and a label can be assigned to the unknown object (e.g., to classify it) using the trained object recognition model. Finally, a number of corresponding devices can be controlled based on the label.

In another aspect, the unknown object is a navigation object and controlling a device includes causing a vehicle to navigate based on the navigation object.

In yet another aspect, embedding the low-level features with multiple high-level representations includes mapping vectors from distinct spaces into a common space.

In yet another aspect, mapping vectors from distinct spaces into a common space includes mapping feature vectors from a $m_0$-dimensional space to a m-dimensional space and mapping v-th view semantic vectors from a $m_v$-dimensional space to a common m-dimensional space.

Additionally, a label is assigned to the unknown object if the unknown object matches to a label in unknown object classes, thereby resulting in an object recognition.

In another aspect, a soft-max formulation provides a confidence of each possible classification outcome and the assignment of the label to the unknown object is based on the soft-max formulation.

Additionally, a soft-max function is used to provide a degree of compatibility of a pattern's low-level features and corresponding high-level semantic representations and the assignment of the label to the unknown object is based on the soft-max formulation.

Further, embedding the low-level features with multiple high-level semantic representations unitizes information from multiple views of a label's semantic representation.

In another aspect, wherein in generating the trained object recognition model, the system performs an operation of maximizing a compatibility function value of a feature vector and its matched class high-level representation, while suppressing compatibilities of the feature vector and un-matched class high-level representations.

In another aspect, generating the trained object recognition model includes improving inference accuracy by maximizing the margins between compatible pairs and incompatible pairs.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a pattern recognition system and, more specifically, to pattern recognition system that implements zero-shot learning to recognize input novel patterns found in known data. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) LIST OF INCORPORATED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. J. Deng, N. Ding, Y. Jia, A. Frome, K. Murphy, S. Bengio, Y. Li, H. Neven, and H. Adam. Large-scale object classification using label relation graphs. In ECCV 2014, pages 48-64. Springer, 2014.
2. Christoph H. Lampert, Hannes Nickisch, and Stefan Harmeling. "Attribute-based classification for zero-shot visual object categorization." IEEE Transactions on Pattern Analysis and Machine Intelligence 36.3 (2014): 453-465.
3. Akata, Zeynep, et al. "Evaluation of output embeddings for fine-grained image classification." Proceedings of the IEEE Conference on Computer Vision and Pattern Recognition. 2015.
4. Fu, Zhenyong, et al. "Zero-shot object recognition by semantic manifold distance." Proceedings of the IEEE Conference on Computer Vision and Pattern Recognition. 2015.
5. Bernardino Romera-Paredes and P. H. S. Torr. "An embarrassingly simple approach to zero-shot learning." Proceedings of the 32nd International Conference on Machine Learning. 2015.
6. Ziming Zhang and Venkatesh Saligrama. "Zero-shot learning via semantic similarity embedding." Proceedings of the IEEE International Conference on Computer Vision. 2015.
7. Soravit Changpinyo, Wei-Lun Chao, Boqing Gong, and Fei Sha. Synthesized Classifiers for Zero-Shot Learning. In Proceedings of the IEEE Conference on Computer Vision and Pattern Recognition (CVPR), 2016.
8. Chuang Gan, Tianbao Yang, and Boqing Gong. "Learning Attributes Equals Multi-Source Domain Generalization." In Proceedings of the IEEE Conference on Computer Vision and Pattern Recognition (CVPR), 2016.
9. K. Simonyan, A. Zisserman, "Very Deep Convolutional Networks for Large-Scale Image Recognition," arXiv technical report, 2014.
10. Mikolov, Tomas; et al. "Efficient Estimation of Word Representations in Vector Space". arXiv:1301.3781 (2013).

(2) PRINCIPAL ASPECTS

Various embodiments of the invention include three "principal" aspects. The first is a pattern recognition system. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
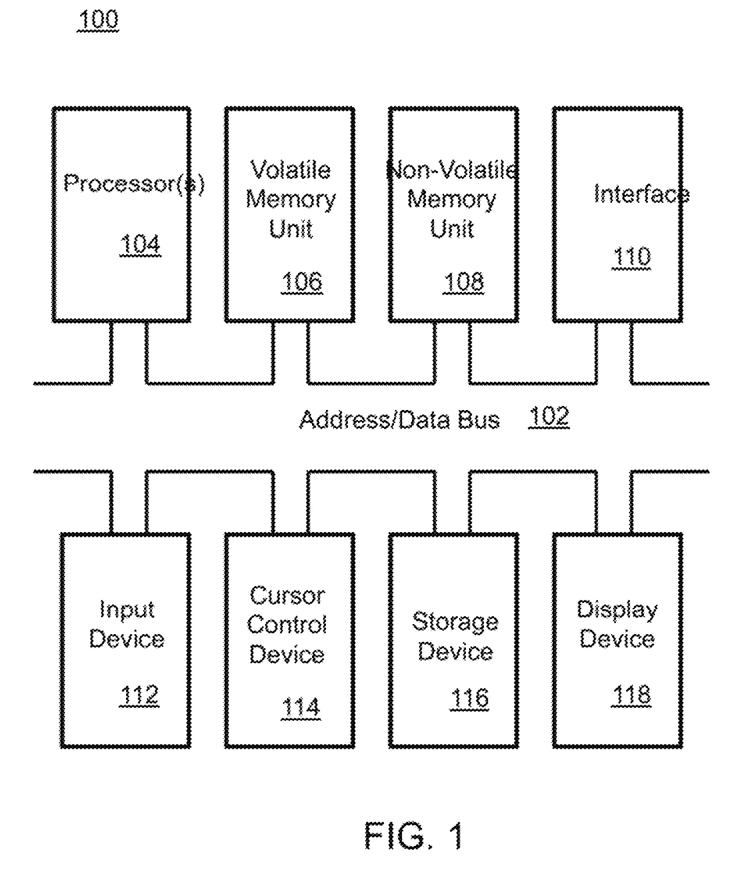
FIG. 1 is a block diagram depicting the components of a system according to various embodiments of the present invention.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
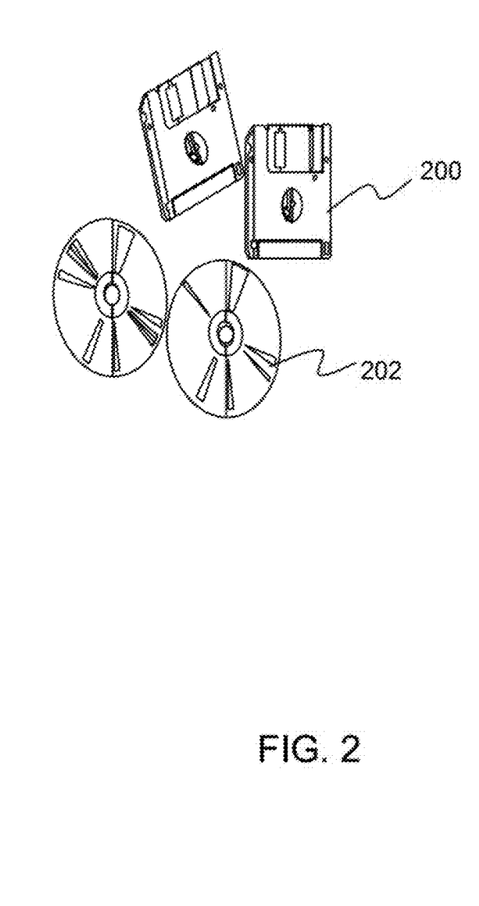
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

This disclosure provides a system and method for zero-shot learning (ZSL), which is used for novel pattern recognition in a variety of modalities. For example, input patterns can be an image, a video, a time-series of signal, or a mixture of text and multimedia data (as in social media). In various embodiments, the input can be visual, audio, chemical, textual, or multimodal. The system learns, from existing data, how observable features in a pattern are 'structurally' mapped to a set of semantic attributes. This learned mapping (or mathematical projection) is used to recognize input novel patterns that share the features found in the known data, assuming that it is known how the novel data is defined in terms of their semantic attributes. The system output is the recognized class for a given input pattern (e.g., the class name 'school bus pickup' for the input image in FIG. 4).

Some unique aspects of the method/algorithm used in this system include: 1) it formulates a soft-max based compatibility function to efficiently capture the degrees of compatibility of a pattern's low-level feature and its label's high-level semantic representation; 2) this algorithm intrinsically unitizes information from multiple views of a label's semantic representations; 3) this algorithm indirectly learns a mapping for vectors from low-level features to an embedded space and learn the mappings for multi-view semantic vectors to the same embedded space. This is unlike the typical embedding techniques in which related patterns (vectors) are embedded in a neighborhood. Instead, in the embedding approach according to some embodiments of the present disclosure, this assumption is relaxed so that the system can flexibly exploit any efficient structures of related patterns.

While multi-space embedding techniques have been proven efficient in ZSL, many previous approaches only considered maximize the compatibility function of an instance's low-level feature and its corresponding high-level representation. The system according to the present disclosure is not only able to maximize the compatibility function value of a feature vector and its matched class' high-level representation, but at the same time, suppress the compatibilities of that feature vector and the un-matched class high-level representations. In other words, the system described herein maximizes the margins between compatible pairs and incompatible pairs, thus resulting in a better inference accuracy. In addition, the soft-max formulation is intrinsically a probabilistic interpretation which provides the confidence of each possible classification outcome. Such a confidence can dramatically enhance the decision-making process, and improve the classification accuracy. Thus, described is an improved pattern recognition system that uses a soft-max approach, in which the compatibility function values are represented by probability measures, thus the range of compatibility function values are in interval [0, 1]. Further, a need exists for a system that uses a best-fit kind of optimization formulation, while not only trying to maximize the value of the matched class, but also minimizing the value of the un-matched class. By maximizing such compatibility margins, the classification errors provided by such a system can be reduced in the inference phase.

As can be understood by those skilled in the art, there are a number of practical applications for an improved pattern recognition system in which a device can be controlled based on the pattern recognition. As a non-limiting example, the system provides a key functionality for the extension of autonomous vehicle operation to new situations and road conditions. The system may also provide functionality for extension of driver-assistance systems that affect steering, braking, handling. The system can be implemented with autonomous or partially automated vehicles to allow such vehicles to operate outside carefully mapped and controlled areas and conditions (new traffic signs, new areas with no clear lane markings, or new weather) and generate labels for unknown objects. In such an example, the vehicle would receive as input a streaming video and, for example, recognize new navigation objects such as streets, traffic signs, vehicles, people, or other objects that may have an impact on how the vehicle is controlled. Based on such recognition of the navigation objects, the system could generate commands and cause the vehicle to navigate accordingly by causing the vehicle to maneuver the street based on the street pathways and traffic signs (e.g., stop at stop sign or turn to follow the newly identified roadway).

The system can also be used to improve automated software for unmanned aerial vehicle (UAV) ground stations that can identify objects and behaviors using human generated verbal descriptions. It could enable autonomous UAV flight and exploration in new areas, transfer learning among multiple UAVs, reduced training time, and reduced manpower required for UAV operations. The system is also applicable to mobile threat detection, multimodal biometrics recognition, and noble topic answering.

(4) SPECIFIC DETAILS OF VARIOUS EMBODIMENTS

Figure 3:
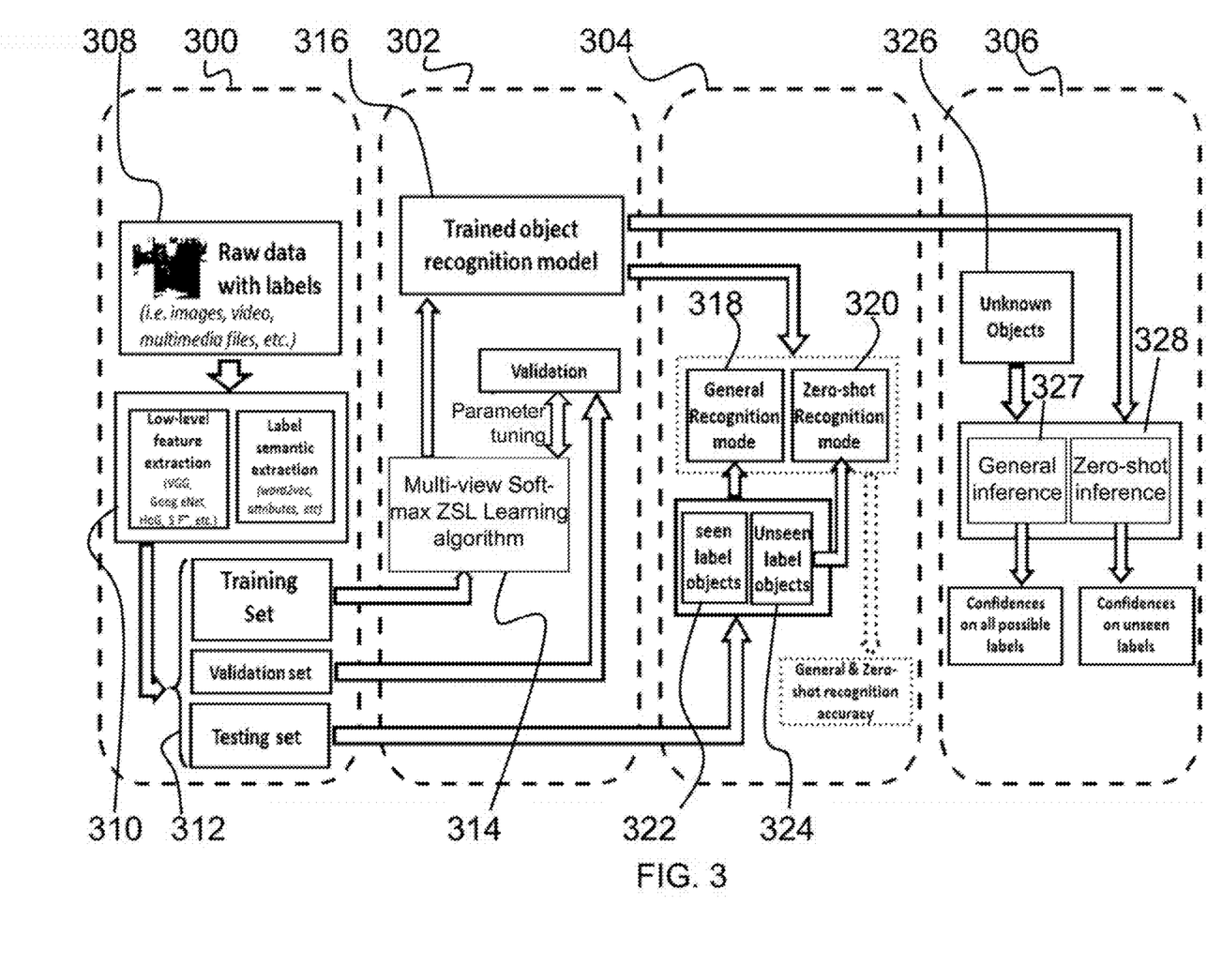
FIG. 3 is a system block diagram of a zero-shot capable objection recognition according to some embodiments of the present disclosure.

As described above, this disclosure provides a pattern recognition system that implements zero-shot learning (ZSL). In conventional objection recognition systems, the training data and the testing data share the same object labels; in contrast, in zero-shot capable object recognition systems, the labels of unknown objects may not be seen during model training. The system according to some embodiments of the present disclosure defines the key role in such a zero-shot capable system; namely, the zero-shot learning (ZSL) model, which includes the algorithm for training the models and rules for object recognition and inferences. A system level diagram of a zero-shot capable pattern recognition system is shown in FIG. 3. The system includes four main modules, including the representation extraction module 300, the model training module 302, the model testing module 304, and the object recognition module 306.

The representation extraction module 300 includes three sub-modules, a sensor submodule 308, an extraction submodule 310, and a database submodule 312.

The sensor submodule 308 is responsible for collecting raw data of the objects from sensors, networks, or any other suitable location for obtaining relevant raw data. Depending on the applications, the objects may be multimedia files (i.e. images, videos), text files (i.e. network log), time series (i.e. body sensor reading), etc.

The extraction submodule 310 is responsible for transforming the raw data and labels into informative representations. It should be noted that, in some embodiments, the labels are already annotated in the training dataset (usually user defined or automatically determined at the data collection time). Specifically, there are two tasks. First, the extraction submodule 310 transforms the objects into low-level features; this can be realized by employing state-of-the-art representation models such as a deep convolution neural network (see Literature Reference No. 9). Second, the representation submodule 310 transforms the high-level labels into multiple views of semantic representations. This is done by using the word2vec representation and the binary semantic attribute vectors defined by the user (see, for example, Literature Reference No. 10).

A label (for example, 'tiger' in the animal dataset) can be represented with a set of sematic attributes (for example, {'having four legs', 'black stripes', 'running fast', 'long tail'}). Theses attribute sets can be defined in multiple ways depending on how they are described. For example, the word2vec model takes as its input a large corpus of text and produces a vector space, typically of several hundred dimensions, with each unique word in the corpus being assigned a corresponding vector in the space. On the other hands, the binary attribute vectors are simply defined with their vector elements with 0 or 1, where 1 means that the label has the semantic attribute specified by the element (for example, Attribute 'have four legs' equal to 1 for Label 'tiger').

The database submodule 312 is responsible for storing, indexing and querying objects to be stratified into a training set, a validation set, and a testing set.

The model training module 302 is a key part of the system because the zero-shot pattern (e.g., object) recognition model is trained in this module. Specifically, the multi-view soft-max zero-shot learning model 314 is in this module 302, which is used to generate a trained object recognition model 316. This module 302 is described in further detail below.

The model testing module 304 evaluates the efficiency of the recognition model 316 using a testing procedure to see if the trained model works well in recognizing objects using testing data. The performance of the learned recognition model 316 will be evaluated in two modes: general object recognition mode 318 and zero-shot object recognition mode 320. In the general object recognition mode 318, the model 316 will be tested on objects with seen 322 or unseen 324 labels; while in the zero-shot object recognition mode 320, the model 316 will be only tested on objects with unseen 324 labels.

The trained object recognition model 316 will be deployed in the object recognition module 306 for unknown object 326 recognitions. There are two modes in object recognition, including both a general inference mode 327 and a zero-shot inference mode 328. Depending on the application, a user can choose either or both of the modes. For example, one might choose to use the general inference mode 327 when it is unknown if test objects are known or unknown. Alternatively, one might choose to use the zero-shot inference mode 328 when it is known that test objects are from the set of unknown objects.

Although, zero-shot learning typically focuses on computer vision applications, the zero-shot capable pattern recognition system described herein is highly applicable to other applications, such as, behavior recognitions, cyber security, social data analytics, etc. Further detail regarding the system is provided below.

(4.1) Mathematical Formulation

For novel pattern recognition in testing, the training data sets include low-level features, and high-level semantic representation of labels. However, one semantic representation may only provide limited information (descriptions) of a label; therefore, including multiple views from external sources and knowledge bases allows the model to have more complete information of the label and improve the accuracy. This disclosure provides a soft-max based algorithm for ZSL tasks in which multiple views of semantic representations are utilized.

Figure 5:
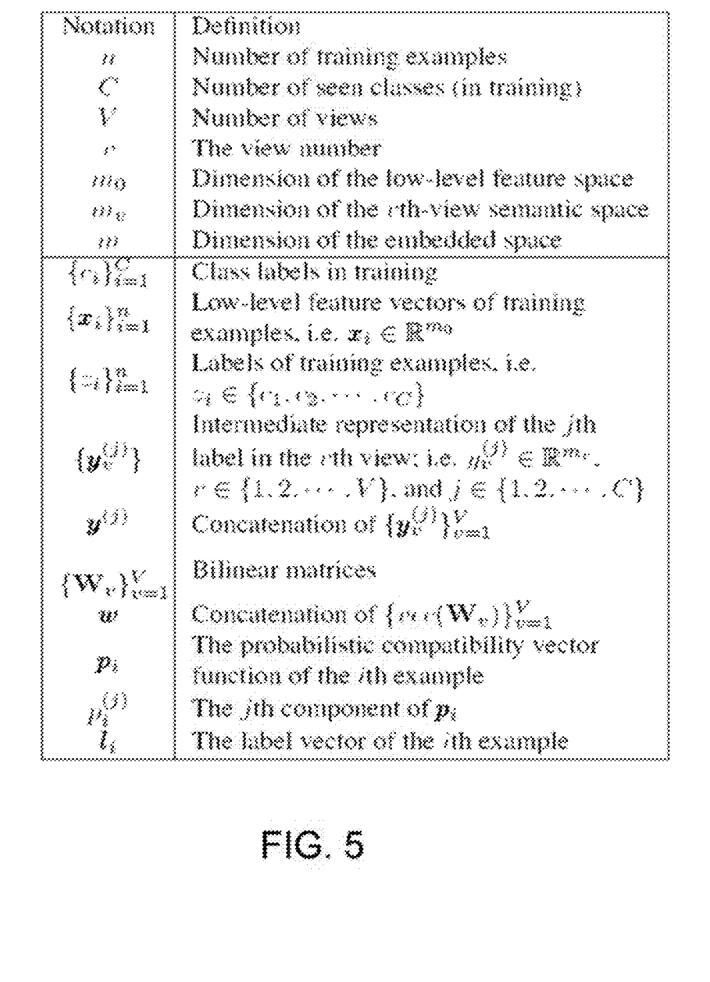
FIG. 5 is a table depicting notations used in mathematical derivations according to some embodiments of the present disclosure.

The multi-view soft-max zero-shot learning model 314 uses multi-view learning to learn the embedded semantic representation which capsulizes the low-level feature space and multiple high-level semantic representation spaces. For example, assume that there are n objects (or instances) in the training set. Each object is associated with a low-level feature vector denoted by $x_i \in R^{m_0}$, which can be obtained from the extraction submodule 310. Each object is provided with a unique label $z_i \in \{c_1, c_2, c_C\}$. Each label is associated with a high-level semantic representation in a vector form, $y_v(z_i) \in R^{m_v}$, which can also be obtained from the extraction submodule 310. These associations are referred to as a class-specific prototype vector of the class in view v. Therefore, if two objects have the same label, they will associate with the same class prototype; namely, the high-level representation of these two objects are the same. Here, it is assumed that there are V number of views for the high-level semantic representation. The output of our model is a conditional probability, as follows:

$$p_i^{(j)} = p(z_i = c_j | x_i, \{y_v^{j'}\}_{j'=1}^c; W_v)$$

which is a confidence of the ith object having label j, given the object's low-level feature, semantic representations of all possible labels, and model parameters $\{W_v | v=1, 2, 3, \ldots V\}$. Thus, the goal of the learning algorithm is to learn the set of the parameters from the training data. The notations used in the mathematical derivations are listed in the table illustrated in FIG. 5.

(4.2) Multi-View Embedding

An objective of an embedding technique is to map vectors from different spaces to a common space, such that there is a unified representation (e.g. same dimensionality) for the vectors, allowing for a convenient comparison of the vectors. The embedding function for the feature space is denoted as $g_f(.)$, and the embedding function of the v-th view of the semantic space is denoted as $g_v(.)$, then the vector representation of a feature $x_i$ and $y_v^{(j)}$ (note that $y_v^{(j)}$ is a short hand notation of $y_v(c_j)$) are $g_f(x_i)$ and $g_v(y_v^{(j)})$, respectively. One of the most widely used, and efficient mapping is the linear mapping, namely, $g_f(x_i) = W_f x_i$, and $g_v(y_v^{(j)}) = W_v y_v^{(j)}$, where $W_f \in R^{m \times m_0}$ and $W_v \in R^{m \times m_v}$ are matrices which map the feature vectors from a $m_0$-dimensional space to a m-dimensional space and map the v-th view semantic vectors from a $m_v$-dimensional space to the same m-dimensional space, as shown as element 402 in FIG. 4.

Figure 4:
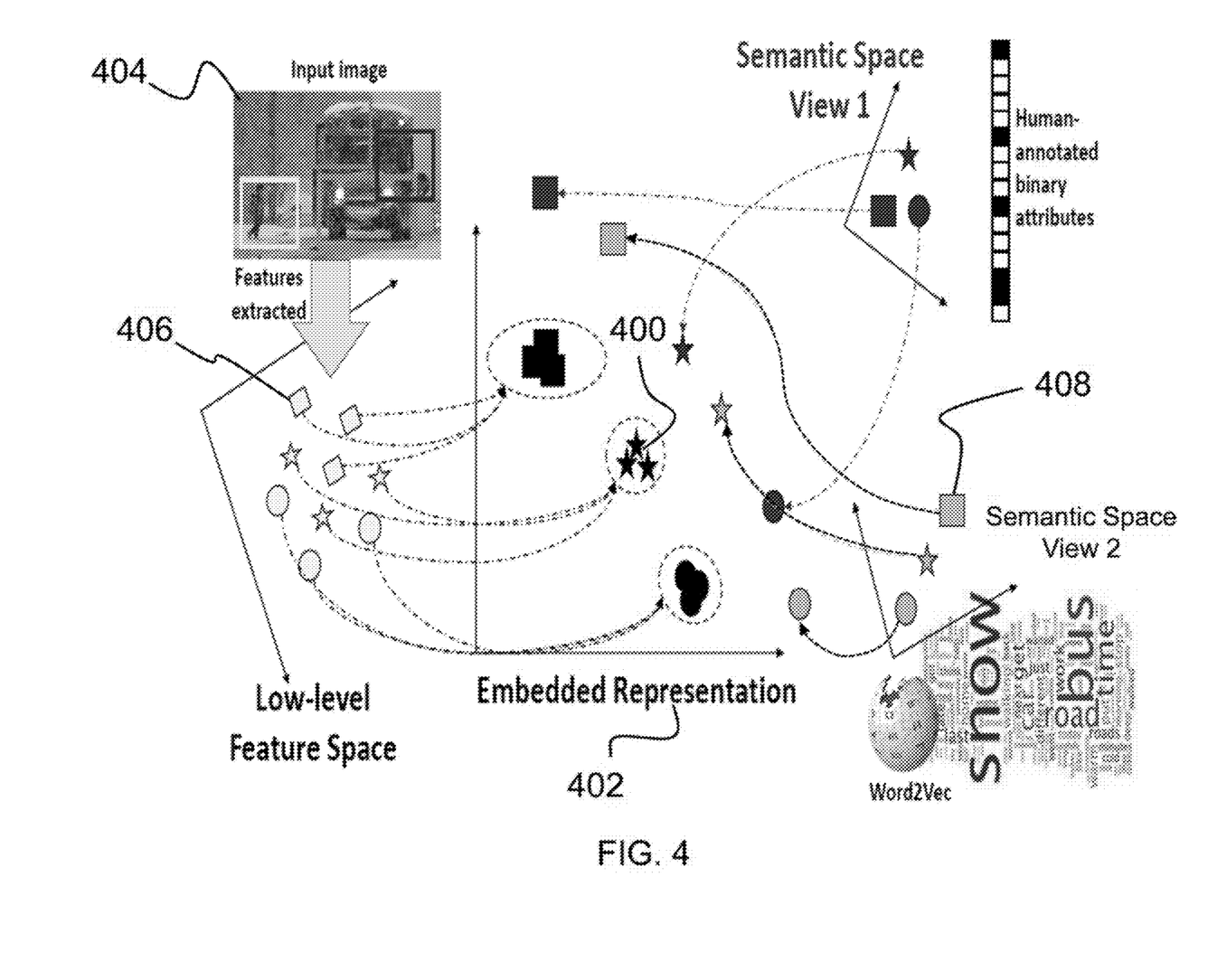
FIG. 4 is an illustration depicting multi-view embedding according to some embodiments of the present disclosure.

In most of the embedding approaches, people usually assume that the related vectors from different spaces will be mapped to a neighborhood in the embedded space; however, in the process of this disclosure, this assumption is relaxed to a more general one—after embedding two related vectors from different spaces to an embedded space, the two embedded vectors need not be in the same neighborhood. However, related vectors after embedding should create some sort of structure. For example, in traditional embedded assumptions, after embedding, the objects with the same shape should be mapped into the same neighborhood; however and as shown in FIG. 4, the present system operates under an assumption that after the embedding, the related vectors with the same label form a structure (e.g., the various objects with the same shape will form a triangle 400 in the embedded space 402). When multiple objects with the same label are recognized, the same shape may be formed for each of the multiple objects with the same label. The shape formed may depend on the number of related vectors that are embedded in the embedded space. When a non-visual approach is used, the related vectors in the same space may have a set relationship (e.g., distance, parameter proportion) that would translate to a structure if visualized. The set relationship may be repeated for multiple objects with the same label in the embedded space.

Specifically, FIG. 4 illustrates how low-level features 406 extracted from images 404 and multiple high-level semantic representations 408 can be simultaneously mapped into the embedded space 402 to make them as compatible (similar) as possible. This mapping process, as shown in FIG. 4 and performed in the training phase using the training data of 'known' object or scene classes, will capture how the low-level image features (e.g., the features extracted within the different bounding boxes in the input image) are related with the high-level semantic descriptions (e.g., a walking child, head lights, tires, a stop sign, a yellow bus) of the scene label (e.g., 'a school bus picking up a child'). By using the system, the same features-to-semantics mapping in the embedded space, which is a unique method that the prior art cannot achieve, teaches how a new image of 'untrained' or 'unknown' scene class can be classified. For example, an image that contains image features representing a child moving away from a car with an open door around which other children are walking can be classified to the scene label of 'school drop off', even though the data of this novel scene class/type were not used in the recognition system training.

(4.3) Compatibility Function (CF)

A compatibility function (CF), F: $R^{m_0} \times R^{m_v} \rightarrow R$ is a function, denoted by F(., .), that takes a feature vector and a semantic vector as inputs, and return a scalar value. Note that, for simplicity, more details about the formulation of the compatibility function in the case are provided with a single view; the multi-view case can be easily formulate based on the single view case. The output of the compatibility function is a measure of how compatible a feature vector is with a semantic vector. Generally speaking, the design of the compatibility function is one of the most crucial parts in a zero-shot learning based pattern recognition algorithm. In the process of this disclosure, instead of using the feature vector and the semantic vector directly from their original spaces, the embedded version of these two vectors is used. Because the embedding mapping is designed so that the related objects will form some structures, the advantages from this structure can be used in the compatibility function. Moreover, after the embedding, both the mapped feature vector and the semantic vector will have the same dimensionality; this enable one to design a simpler and more effective compatibility function. In the process of this system, the compatibility function, which takes two vectors, a and b, with the same dimensionalities as $f(a, b) = a^T b$, provides the following, where i is the input instance index, j is the class index, and v is the view index:

$$F(x_i, y_v^{(j)}) = f[g_f(x_i), g_v(y_v^{(j)})] \quad (1)$$
$$= f(W_f x_i, W_v y_v^{(j)})$$
$$= (W_f x_i)^T (W_v y_v^{(j)})$$
$$= x_i^T W_f^T W_v y_v^{(j)}$$
$$= x_i^T W_v y_v^{(j)}$$

This compatibility function is essentially the inner product of the two vectors in the embedded space. The intuition is that if the feature vector and the semantic vector are compatible with each other, their inner product of their embedded version will be large. This formulation of compatibility function, which is called bilinear function, has been used in many existing zero-shot learning approaches due to its simplicity and efficiency. The matrix $W_v$ is called bilinear matrix. The most important advantage of replacing two mapping functions, $W_f$ and $W_v$, with the bilinear matrix, $W_v$ is that the system does not need to determine the dimensionality of the embedded space; the dimensionality of the embedded space can be very small, which could reduce the computational cost; however, it can be also very large, up to infinity. The optimal $W_v$ is always equivalent to the matrix product of the optimal $W_f$ and $W_v$.

(4.4) A Probabilistic Compatibility Vector Function

This disclosure introduces a probabilistic compatibility vector function (PCVF) or soft-max function. A PCVF is defined as:

$$p_i(W_v) = \begin{pmatrix} p_i^{(1)} \\ p_i^{(2)} \\ p_i^{(j)} \\ \vdots \\ p_i^{(C)} \end{pmatrix}, \quad (2)$$

where $$p_i^{(j)}(W_v) = \frac{\exp(x_i^T W_v y_v^{(j)})}{\sum_{j'=1}^{C} \exp(x_i^T W_v y_v^{(j')})}. \quad (3)$$

The vector $P_i$ is called a probabilistic compatibility vector function because it is used as a compatibility function, and at the same time, each element of $p_i$ represents a probability as follows:

$$p_i^{(j)} = p(z_i = c_j | x_i, \{y_v^{j'}\}_{j'=1}^{c}; W_v), \quad (4)$$

which is a conditional probability of the event, "$c_1$ is the label of the i-th instance", given the feature vector, all the class prototype vectors, and the bilinear matrix $W_v$. Equation 3 is also called the soft-max function.

Vectorizing $x_i^T W_v y_v^{(j)}$ provides:

$$\text{vec}(x_i^T W_v y_v^{(j)}) = [x_i^T \otimes (y_v^{(j)})^T]\text{vec}(W_v). \quad (5)$$

If $[x_i^T \otimes (y_v^{(j)})^T]$ is substituted by $\alpha_i(j)$ and $\text{vec}(W_v)$ is substituted by w, $p_i^{(j)}$ can be rewritten as follows:

$$p_i^{(j)} = \frac{\exp(\alpha_i(j)^T w)}{\sum_{j'=1}^{C} \exp(\alpha_i(j')^T w)} \quad (6)$$

(4.5) Formulation of the Objective Function

To find the optimal bilinear matrix or its vectorized version, an optimization problem needs to be formulated so that the resultant model can fit the training data. Here, the label vector of the i-th instance is defined as the following:

$$l_i^T = [l_i^{(1)}, l_i^{(2)}, \ldots, l_i^{(C)}], \text{ where } l_i^{(j)} = \begin{cases} 0, & \text{if } z_i \neq c_j \\ 1, & \text{if } z_i = c_j \end{cases}. \quad (7)$$

The optimization problem is formulated as the following:

$$\underset{w}{\text{minimize}}\ f(w) = \frac{1}{n}\sum_{i=1}^{n} \|p_i - l_i\|_2^2 + \lambda_0 \|w\|_2^2. \quad (8)$$

The first term of the objective function represents the total classification error, and the second term is the regularization on the parameters. The first differentiation of the objective function can be derived with respect to the parameter as the following:

$$\frac{\partial f(w)}{\partial w} = \frac{1}{n}\sum_{i=1}^{n} \frac{\partial p_i}{\partial w}(p_i - l_i) + \lambda_0 w, \quad (9)$$

where $$\frac{\partial p_i}{\partial w} = \left( \begin{array}{ccccc} | & | & & | & & | \\ \frac{\partial p_i^{(1)}}{\partial w} & \frac{\partial p_i^{(2)}}{\partial w} & \cdots & \frac{\partial p_i^{(j)}}{\partial w} & \cdots & \frac{\partial p_i^{(C)}}{\partial w} \\ | & | & & | & & | \end{array} \right) \quad (10)$$

$$= A_i(I - p_i 1^\top)\text{diag}(p_i)$$

and $$A_i = \left( \begin{array}{ccccc} | & | & & | & & | \\ \alpha_i(1) & \alpha_i(2) & \cdots & \alpha_i(j) & \cdots & \alpha_i(C) \\ | & | & & | & & | \end{array} \right). \quad (11)$$

The procedure of learning the model parameter is shown in Algorithm 1 below. Note that this optimization problem is an unconstrained convex problem, thereby providing the global optimal solution. With the first order differentiation information, first order quasi-newton methods can be exploited to solve the problem. Once the optimal solution, $w_{opt}$, is found, the system can predict the label of a novel instance $x_k$ by finding the label index, j, through the following:

| Algorithm 1 Learning w via SGD |
|---|
| Require: |
| 1:     $\{x_i\}_{i=1}^n$, low-level feature of training examples |
| 2:     $\{z_i\}_{i=1}^n$, class labels of training examples |
| 3:     $\{y^{(j)}\}_{j=1}^C$, concatenated class-specific semantic vectors of seen classes in training |
| 4:     $\eta$ and $N_{iter}$    ▷ Step size and max iteration number |
| Ensure: |
| 1:     w, concatenation of $\{\text{vec}(W_v)\}_{v=1}^V$ |
| Procedure: |
| 1:     initialize w |
| 2:     counter ← 0 |
| 3:     while counter < $N_{iter}$ do |
| 4:       i ← mod (counter, n) + 1 |
| 5:       $\frac{\partial p_i}{\partial w} = A_i(I - p_i 1^\top)\text{diag}(p_i)$ |
| 6:       $w \leftarrow w - \eta \frac{1}{n}\frac{\partial p_i}{\partial w}(p_i - l_i) + \lambda_0 w$ |
| 7:     end while |
| 8:     Return w |

$$j = \underset{j'}{\text{argmax}}\ \alpha_k(j')^T w_{opt}. \quad (12)$$

As noted in the novel scene recognition example illustrated above in Section 4.2, the label index, j, is the output (indicating the input image is recognized as a scene of a school pick-up event) of the invented object recognition system that maximizes the prediction score equation defined in the right side of the argmax function in (12).

(4.6) Experiments and Results

The system can operation in two modes: general object recognition mode and zero-shot object recognition mode. Experiments were conducted in both of the modes and their performances were compared with other state-of-the-art models. The results are provided below.

(4.6.1) Zero-Shot Objection Recognition Experiment

To evaluate the efficiency of the process in the zero-shot object recognition mode, experiments were conducted on 4 benchmark datasets: Animal with Attributes (AwA), aPascal and aYahoo (aPY), Calthech-UCSD Birds-200-2011 (CUB-200-2011), and SUN attributes. In the experiments, the low-level features of images were obtained from the VGG (Visual Geometry Group) very-deep convolution neural network. The splits of training and testing (seen/unseen classes) were the same across all the methods to ensure fair comparisons. Accuracy was used as the metric to evaluate the efficiency. The accuracy of a model is computed by:

$$\text{accuracy} = \frac{\text{\# of correct classification samples}}{\text{\# of total testing samples}} \times 100\%.$$

Figure 7:
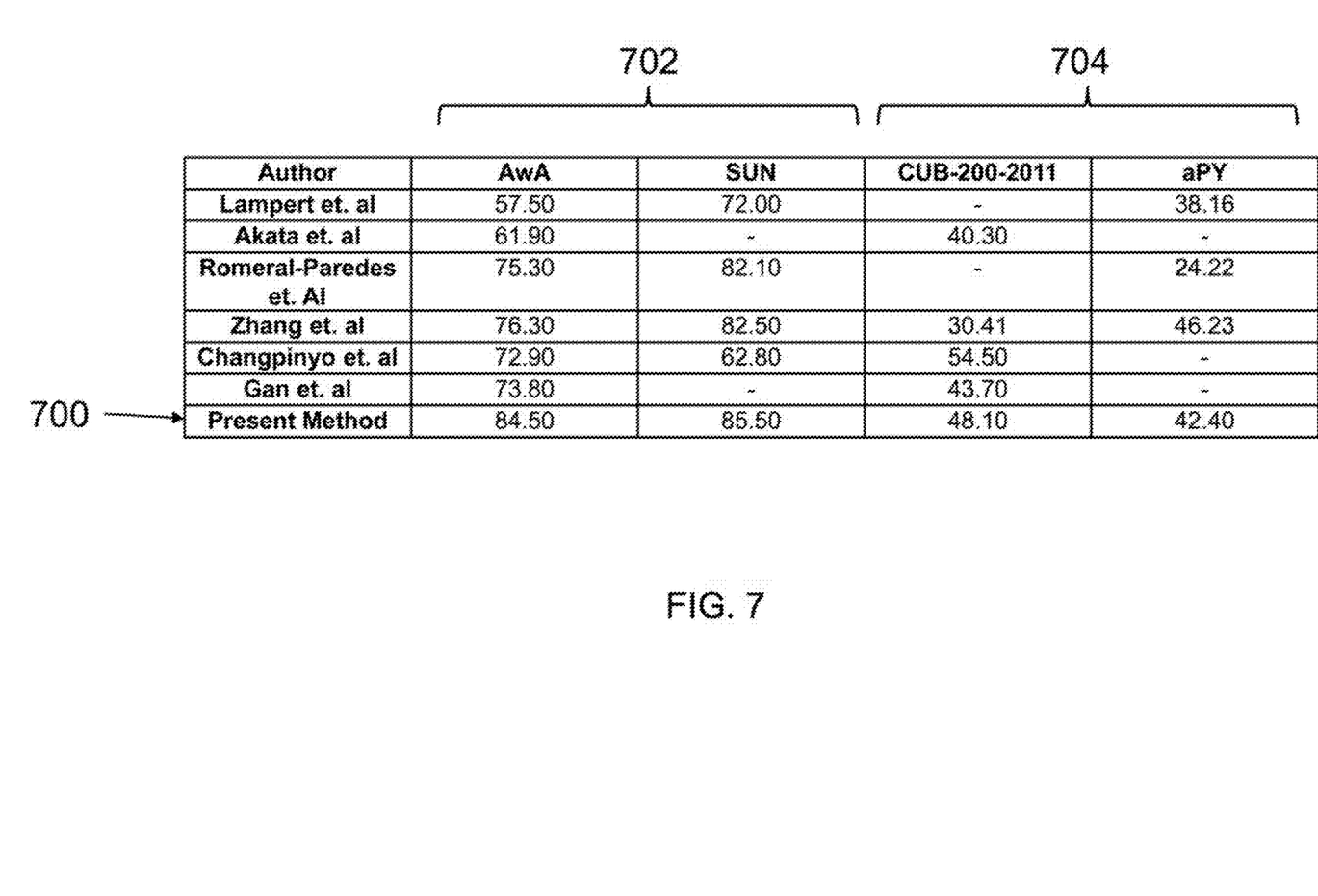
FIG. 7 is a table depicting classification accuracies in a target domain of all baseline methods on all datasets.

The target domain classification accuracies of the baseline methods were obtained from their original published papers or from previous papers that used them as baselines. If the accuracies of a method were found to be different under the same settings and using the same data, the highest one was included in this disclosure. Two views of mid-level semantic representations (i.e. attribute and word vector) were used for each high-level class label in the model according to the present disclosure. For the purpose of reducing computational time in the experiments while learning the model, the low-level features' dimensionality was first reduced from 4,096 to 50 by using principle component analysis, and then the learning method of the present disclosure was applied. The classification accuracies in the target domain of all baseline methods on all datasets are shown in the table as depicted in FIG. 7. The method of this disclosure 700 performed best on two datasets (AwA and SUN, indicated as element 702) and 2nd best on the other two data sets (aPY and CUB, indicated as element 704).

(4.6.2) General Objection Recognition Experiment

To evaluate the efficiency of the present system in the general object recognition mode, experiments were conducted on a driving scene recognition dataset; specifically, the driving scene dataset was a subset of the SUN attributes dataset; it only contains images which are related to driving.

The low-level features of images were obtained from the VGG (Visual Geometry Group) very-deep convolution neural network. Attributes were only used as the semantic representations of the labels, and they only contain driving related attributes. Since general object recognition is considerably more challenging than zero-shot learning object recognition, an evaluation metric called $top_n$ accuracy was used. The $top_n$ accuracy is defined as the follows:

$$top_n \text{ accuracy} = \frac{\text{\# of correct within top } n \text{ guesses}}{\text{\# of total testing samples}} \times 100\%.$$

Figure 6:
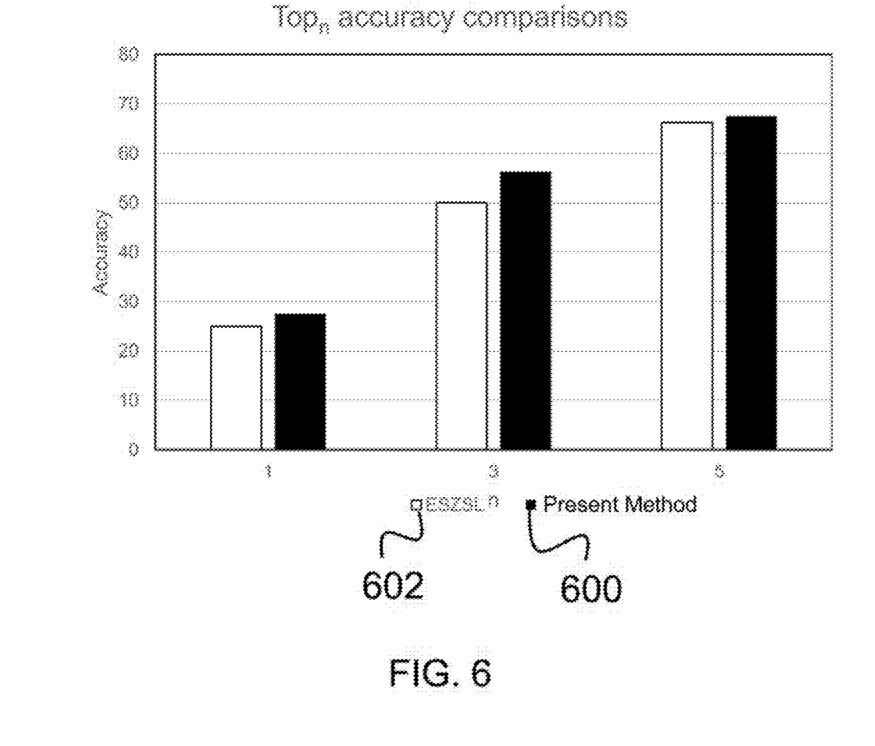
FIG. 6 is a bar graph illustrating a comparison of accuracies using a system according to some embodiments of the present disclosure.

For comparison, the $top_1$, $top_3$, and $top_5$ accuracies were compared with ESZSL, and accuracies in shown in the bar chart as depicted in FIG. 6. As shown, the method 600 of the present disclosure outperforms other 602 state-of-the-art models in both general object recognition and zero-shot object recognition tasks, thereby providing a considerable improvement over state of the art systems.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for multi-view embedding, the system comprising:
one or more processors and a memory, the memory being a non-transitory computer-readable medium having executable instructions encoded thereon, such that upon execution of the instructions, the one or more processors perform operations of:
transforming raw data of objects with corresponding labels into low-level features and high-level semantic representations of the labels; and
generating a trained object recognition model by embedding the low-level features with multiple high-level semantic representations;
receiving data of an unknown object and assigning a label to the unknown object using the trained object recognition model, wherein a soft-max formulation provides a confidence of each possible classification outcome, and the assignment of the label to the unknown object is based on the soft-max formulation; and
controlling a device based on the label.

2. The system as set forth in claim 1, wherein embedding the low-level features with multiple high-level representations includes mapping vectors from distinct spaces into a common space.

3. The system as set forth in claim 2, wherein mapping vectors from distinct spaces into a common space includes mapping feature vectors from a $m_0$-dimensional space to a m-dimensional space and mapping v-th view semantic vectors from a $m_v$-dimensional space to a common m-dimensional space.

4. The system as set forth in claim 1, wherein the unknown object is a navigation object and controlling a device includes causing a vehicle to navigate based on the navigation object.

5. The system as set forth in claim 1, wherein a label is assigned to the unknown object if the unknown object matches a label in unknown object classes, thereby resulting in an object recognition.

6. The system as set forth in claim 1, wherein embedding the low-level features with multiple high-level semantic representations unitizes information from multiple views of a label's semantic representation.

7. The system as set forth in claim 1, wherein generating the trained object recognition model further comprises an operation of maximizing a compatibility function value of a feature vector and its matched class high-level representation, while suppressing compatibilities of the feature vector and un-matched class high-level representations.

8. The system as set forth in claim 7, wherein generating the trained object recognition model includes improving inference accuracy by maximizing the margins between compatible pairs and incompatible pairs.

9. A computer program product for multi-view embedding, the computer program product comprising:
a non-transitory computer-readable medium having executable instructions encoded thereon, such that upon execution of the instructions by one or more processors, the one or more processors perform operations of:
transforming raw data of objects with corresponding labels into low-level features and high-level semantic representations of the labels; and
generating a trained object recognition model by embedding the low-level features with multiple high-level semantic representations;
receiving data of an unknown object and assigning a label to the unknown object using the trained object recognition model, wherein a soft-max formulation provides a confidence of each possible classification outcome, and the assignment of the label to the unknown object is based on the soft-max formulation; and
controlling a device based on the label.

10. The computer program product as set forth in claim 9, wherein embedding the low-level features with multiple high-level representations includes mapping vectors from distinct spaces into a common space.

11. The computer program product as set forth in claim 10, wherein mapping vectors from distinct spaces into a common space includes mapping feature vectors from a $m_0$-dimensional space to a m-dimensional space and mapping v-th view semantic vectors from a $m_v$-dimensional space to a common m-dimensional space.

12. The computer program product as set forth in claim 9, wherein the unknown object is a navigation object and controlling a device includes causing a vehicle to navigate based on the navigation object.

13. The computer program product as set forth in claim 9, wherein a label is assigned to the unknown object if the unknown object matches a label in unknown object classes, thereby resulting in an object recognition.

14. The computer program product as set forth in claim 9, wherein embedding the low-level features with multiple high-level semantic representations unitizes information from multiple views of a label's semantic representation.

15. The computer program product as set forth in claim 9, wherein generating the trained object recognition model further comprises an operation of maximizing a compatibility function value of a feature vector and its matched class high-level representation, while suppressing compatibilities of the feature vector and un-matched class high-level representations.

16. A computer implemented method for multi-view embedding, the method comprising an act of:
   causing one or more processors to execute instructions encoded on a non-transitory computer-readable medium, such that upon execution, the one or more processors perform operations of:
      transforming raw data of objects with corresponding labels into low-level features and high-level semantic representations of the labels; and
      embedding the low-level features with multiple high-level semantic representations to generate a trained object recognition model;
      receiving data of an unknown object and assigning a label to the unknown object, wherein a soft-max formulation provides a confidence of each possible classification outcome, and the assignment of the label to the unknown object is based on the soft-max formulation; and
      controlling a device based on the label.

17. The method as set forth in claim 16, wherein embedding the low-level features with multiple high-level representations includes mapping vectors from distinct spaces into a common space.

18. The method as set forth in claim 17, wherein mapping vectors from distinct spaces into a common space includes mapping feature vectors from a $m_0$-dimensional space to a m-dimensional space and mapping v-th view semantic vectors from a $m_v$-dimensional space to a common m-dimensional space.

19. The method as set forth in claim 16, wherein the unknown object is a navigation object and controlling a device includes causing a vehicle to navigate based on the navigation object.

20. The method as set forth in claim 16, wherein a label is assigned to the unknown object if the unknown object matches a label in unknown object classes, thereby resulting in an object recognition.

21. A system for multi-view embedding, the system comprising:
   one or more processors and a memory, the memory being a non-transitory computer-readable medium having executable instructions encoded thereon, such that upon execution of the instructions, the one or more processors perform operations of:
      transforming raw data of objects with corresponding labels into low-level features and high-level semantic representations of the labels; and
      generate a trained object recognition model by embedding the low-level features with multiple high-level semantic representations;
      receiving data of an unknown object and assigning a label to the unknown object using the trained object recognition model, wherein a soft-max function is used to provide a degree of compatibility of a pattern's low-level features and corresponding high-level semantic representations, and the assignment of the label to the unknown object is based on the soft-max formulation; and
      controlling a device based on the label.

22. A computer program product for multi-view embedding, the computer program product comprising:
   a non-transitory computer-readable medium having executable instructions encoded thereon, such that upon execution of the instructions by one or more processors, the one or more processors perform operations of:
      transforming raw data of objects with corresponding labels into low-level features and high-level semantic representations of the labels; and
      generate a trained object recognition model by embedding the low-level features with multiple high-level semantic representations;
      receiving data of an unknown object and assigning a label to the unknown object using the trained object recognition model, wherein a soft-max function is used to provide a degree of compatibility of a pattern's low-level features and corresponding high-level semantic representations, and the assignment of the label to the unknown object is based on the soft-max formulation; and
      controlling a device based on the label.

23. A computer implemented method for multi-view embedding, the method comprising an act of:
   causing one or more processors to execute instructions encoded on a non-transitory computer-readable medium, such that upon execution, the one or more processors perform operations of:
      transforming raw data of objects with corresponding labels into low-level features and high-level semantic representations of the labels; and
      embedding the low-level features with multiple high-level semantic representations to generate a trained object recognition model;
      receiving data of an unknown object and assigning a label to the unknown object, wherein a soft-max function is used to provide a degree of compatibility of a pattern's low-level features and corresponding high-level semantic representations, and the assignment of the label to the unknown object is based on the soft-max formulation; and
      controlling a device based on the label.

* * * * *